United States Patent [19]

Limbacher

[11] Patent Number: 4,502,583

[45] Date of Patent: Mar. 5, 1985

[54] DRIVE UNIT COMPRISING A MOTOR, A CLUTCH AND A GEAR BOX WITH A SNAP CONNECTION IN THE CLUTCH RELEASE SYSTEM

[75] Inventor: Bernhard Limbacher, Niederwerrn, Fed. Rep. of Germany

[73] Assignee: Fichtel & Sachs AG, Schweinfurt, Fed. Rep. of Germany

[21] Appl. No.: 448,019

[22] Filed: Dec. 8, 1982

[30] Foreign Application Priority Data

Dec. 18, 1981 [DE] Fed. Rep. of Germany ....... 3150150

[51] Int. Cl.³ ............................................. F16D 23/14
[52] U.S. Cl. ................................... 192/98; 192/110 B; 192/70.13; 192/110 S; 403/325; 403/328
[58] Field of Search ................... 192/98, 110 B, 110 S, 192/114 R, 70.13; 403/325, 328, 322

[56] References Cited

U.S. PATENT DOCUMENTS

| 2,913,263 | 11/1959 | Zajac | 403/325 X |
| 4,228,882 | 10/1980 | Huber et al. | 192/98 |
| 4,271,950 | 6/1981 | Kolb et al. | 192/110 B X |
| 4,399,898 | 8/1983 | Olschewski et al. | 192/98 |

FOREIGN PATENT DOCUMENTS

| 2913952 | 10/1977 | Fed. Rep. of Germany | 192/98 |
| 2915989 | 4/1979 | Fed. Rep. of Germany | |
| 2508514 | 10/1976 | France | 192/98 |
| 7703577 | 10/1977 | Netherlands | 192/98 |
| 2046864 | 11/1980 | United Kingdom | 192/98 |

Primary Examiner—Rodney H. Bonck
Assistant Examiner—David D. House
Attorney, Agent, or Firm—Toren, McGeady and Stanger

[57] ABSTRACT

A drive unit comprises a motor with a motor casing, a gear box with a gear box casing, and a pulled-type clutch for torque transmission between the motor and the gear box. The gear box casing is to be fixed to the motor casing. The clutch comprises a clutch release system for transmitting a clutch release force from an actuating pedal to a diaphragm spring of the clutch. In this clutch release system there is provided a snap connection which is closed by approaching the motor casing and the gear box casing towards the relative operative position.

8 Claims, 4 Drawing Figures

DRIVE UNIT COMPRISING A MOTOR, A CLUTCH AND A GEAR BOX WITH A SNAP CONNECTION IN THE CLUTCH RELEASE SYSTEM

SUMMARY OF THE INVENTION

The present invention is directed to a clutch unit having an axis and comprising a clutch housing mounted for rotation about said axis. An annular clutch release member is mounted on the clutch housing for common rotation therewith about said axis and for axial movement with respect to the clutch housing. A clutch release system comprises a non-rotating clutch release unit mounted for axial movement along the axis of the clutch unit with respect to the clutch housing. Further, the clutch release system comprises a release system ring member mounted on said non-rotating clutch release unit by clutch release bearing means for rotation about the axis of the clutch unit and for common axial movement with the non-rotating clutch release unit. A releasable locking mechanism interconnects the annular clutch release member and the release system ring member for common axial movement. One of the annular clutch release member and the release system ring member comprises a radially outward sleeve member and the other of the annular clutch release member and the release system ring member comprises a radially inward sleeve member. These sleeve members are axially coextensive over at least part of their respective axial lengths.

A clutch unit of this type is known from German Offenlegungsschrift No. 29 15 989. In this known construction the locking mechanism comprises clamp members which must be inserted into grooves and slots of the sleeve members, in order to lock the sleeve members with respect to each other. These clamp members must be mounted after the sleeve members have been brought in the operational position with respect to each other. Moreover, these clamp members must be secured against unlocking by centrifugal forces resulting from the rotation of the sleeve members with the clutch. The clamp members can be assembled and disassembled only in definite angular positions with respect to the gear casing of an associated gear box.

Therefore, it is the primary object of the present invention to provide a lock mechanism which permits easy assembling and disassembling of the clutch unit with an associated gear box. A further object is to provide a more reliable locking mechanism.

In accordance with the present invention the outward sleeve member is provided with a plurality of circumferencially distributed slots. Each of these slots penetrates through the outward sleeve member with an angle of inclination of less than 90° with respect to the axis. The inward sleeve member is provided with an annular groove in its radially outer surface. The annular groove is in the assembled condition substantially in radial alignment with the radial inner ends of the slots. Roller members are provided in the slots and engage the annular groove. These roller members have terminal portions extending beyond the radially outer surface of the outward sleeve member. A roller engagement ring surrounding the outward sleeve member engages the terminal portions of the roller members in the axial direction. Spring means act against the roller engagement ring in the axial direction such as to urge the roller members towards the radially inner ends of the slots and—in the locked condition—into engagement with the annular groove. The radially outer surface of the inward sleeve member comprises a conically shaped terminal section urging the roller members towards the radially outward ends of the slots when the inward sleeve member is inserted into the outward sleeve member before the roller members can enter into the annular groove such as to axially lock the sleeve members with respect to each other.

The clutch unit of this invention permits easy assembling and disassembling of the clutch unit with the casing of an associated gear box. The assembling becomes most easy because one must only insert the conically shaped terminal section of the inward sleeve member into the outward sleeve member in order to obtain the locking condition.

It has been found that high clutch release forces can be transmitted by the locking mechanism of this invention, so that this invention can be applied also to large clutch units in which high torques are to be transmitted.

According to a preferred embodiment of this invention the outward sleeve member is a portion of the annular clutch release member and the inward sleeve member is a portion of the release system ring member.

In view of further facilitating the disassembling of the clutch unit and an associated casing of a gear box a locking mechanism release ring is provided which axially engages the terminal portions of the roller members on the side remote from the roller engagement ring. In order to release the locking mechanism one must only shift the locking mechanism release ring against the action of the spring means so that the roller members are moved in a radially outward direction within the slots. This makes it possible to release the locking mechanism in each angular position.

In order to secure the roller members against unintended movement along their respective axes, i.e. in the tangential direction with respect to the axis of the clutch unit, the locking mechanism release ring may comprise an axially extending sleeve section surrounding the terminal portions of the roller member. The spring means may be established by a helical compression spring or by a plate spring.

The shape of the slots and the shape of the annular grooves may be such that the clutch release forces transmitted to the sleeve members urge said roller members toward engagement with the annular groove. So high clutch release forces may be transmitted on the one hand, and the spring means may be relatively weak on the other hand.

This invention is particularly adapted for use in clutch units known as "pulled type clutch units". In such pulled type clutch units the clutch release unit is axially moved away from the clutch housing and towards an associated gear box casing when it is desired to release the clutch.

This invention may be used, when the clutch release unit is preassembled with the clutch unit before the clutch unit is assembled with the gear casing of an associated gear box. The invention is however of particular importance in cases in which the clutch release unit is preassembled with an associated gear box casing before assembling the clutch unit and the gear box casing. In this latter case the problem of locking and unlocking the locking mechanism between the inward sleeve and the outward sleeve is of particular importance.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
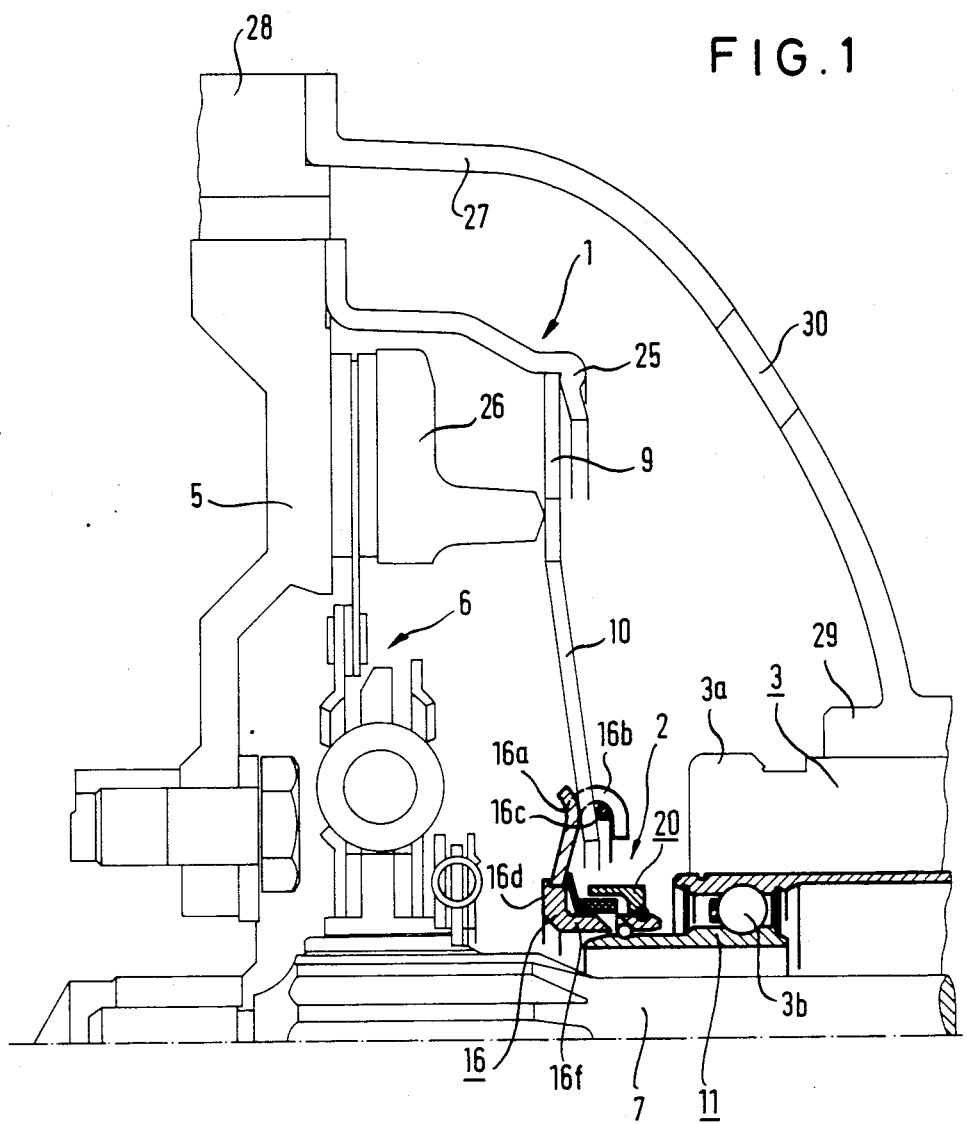
FIG. 1 is an axially extending sectional view of parts of a clutch unit assembled with the casing of an associated gear box.

In FIG. 1, 5 designates a driving disk of a driving unit (not shown) for example of an internal combustion engine. A clutch 1 is fixed to the driving disk 5. The clutch 1 comprises a clutch housing 25 fixed to the driving disk 5. A clutch disk 6 is housed within the clutch housing 25. The clutch disk 6 is mounted on a gear box input shaft 7 for axial movement with respect to this shaft and for common rotation therewith. A pressure plate 26 is provided within the clutch housing 25 such that the clutch disk 6 is positioned between the drive disk 5 and the pressure plate 26. The pressure plate 26 is axially moveable with respect to the clutch housing 25 and is fixed for common rotation with the clutch housing 25. A diaphragm spring 9 is supported by the clutch housing 25 and acts onto the pressure plate 26 so as to urge the pressure plate 26 against the clutch disk 6 and the driving disk 5. FIG. 1 shows the clutch unit in the engaged position.

In view of releasing the clutch so as to separate the gear box input shaft 7 from rotation with the driving disk 5 the radially inward directed tongues 10 of the diaphragm spring 9 must be moved to the right as shown in FIG. 1.

The clutch 1 is housed within a dome-shaped part 27 of a gear box casing. This part 27 of the gear box casing is fixed to a part 28 of the motor casing. The gear box casing 27 comprises a guiding sleeve 29 in which a clutch release system 3 is axially guided. The clutch release system 3 comprises a non-rotating clutch release unit 3a, which is axially moveable within the guiding sleeve 29. A release system ring member 11 is rotatably mounted in the non-rotating clutch release unit 3a by a ball bearing 3b.

At the radial inner end of the tongues 10 there is provided an annular clutch release member 16. This clutch release member 16 comprises a fixing member 16a with a plurality of fixing hooks 16b which penetrate through the gaps between subsequent tongues 10 and engage the tongues 10 through a fixing ring 16c. The fixing member 16a is connected to a flange member 16d which is integral with a sleeve member 16f. The sleeve member 16f is positioned radially outward of the release system ring member 11. The sleeve member 16f is locked to the release system ring member 11 by a locking mechanism 2 which is shown in more detail in FIG. 2.

Figure 2:
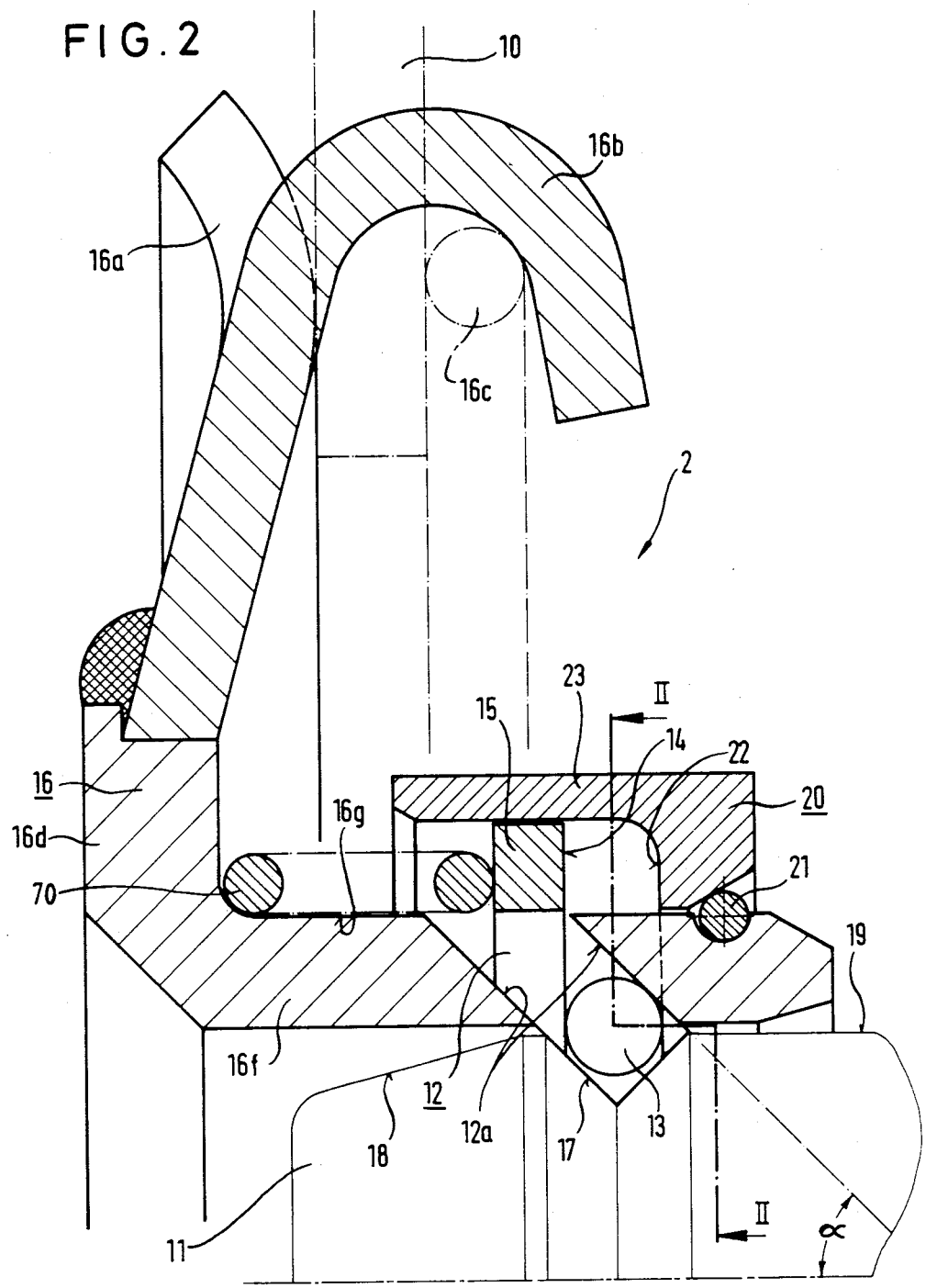
FIG. 2 is an enlarged axial section of the locking mechanism.

As can be seen from FIG. 2 the release system ring member 11 can be regarded as a radially inward sleeve member as compared with the radially outward sleeve member 16f. The outward sleeve member 16f surrounds the inward sleeve member 11.

The outward sleeve member 16f is provided with a plurality of slots 12 which are defined by slot faces 12a. The slot faces 12a define an angle $\alpha$ of less than 90°, preferably less than 60° and most preferably about 45°, with the axis of the clutch disk unit as shown in FIG. 2. The planes containing the slot faces 12a of all slots 12 intersect with the axis in the same location.

Figure 3:
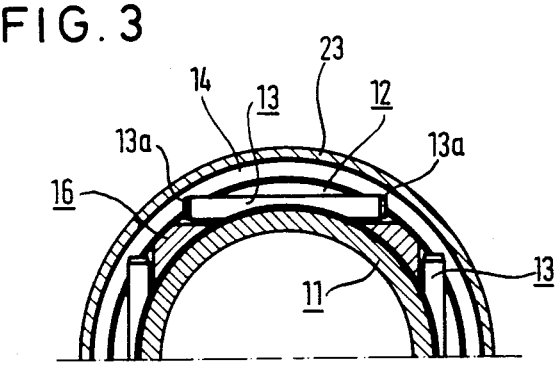
FIG. 3 is a section according to line II—II of FIG. 2 with the rollers being in their radially inner position.
Figure 4:
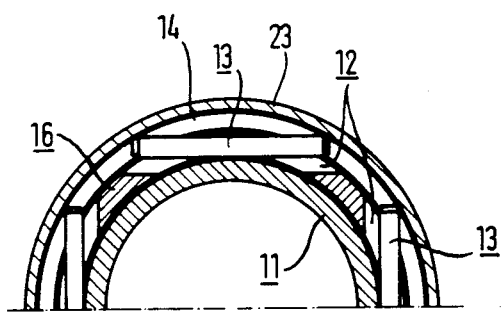
FIG. 4 is a section identic to the section of FIG. 3 with the rollers being in the radially outer position.

There are provided four slots 12 as shown for example in FIG. 3. The number of slots may, however, also be different from four, for example three. The slots 12 penetrate completely through the outward sleeve 16f. The radially inner ends of the slots 12 are substantially in radial alignment with an annular groove 17 which is provided in the radially outer cylindrical surface 19 of the inward sleeve member 11 or ring member.

Roller members 13 are positioned within the slots 12. The roller members 13 are substantially tangential with respect to the axis of the clutch unit. The roller members 13 engage with their middle portions into the circumferential groove 17 as shown in FIG. 2 when the locking mechanism is in the locked position. The roller members 13 have terminal portions 13a which extend even in the most inward position of the roller members 13 as shown in FIG. 2 beyond the radially outer surface 16g of the outward sleeve 16f. A roller engagement ring 15 surrounds the outward sleeve 16f and is axially guided on the radially outer surface 16g. This roller engagement ring 15 has a front face 14 engaging the terminal portions 13a of the rollers 13. A helical compression spring 70 acts against the other front face of the roller engagement ring 15 and is supported by the flange member 16d. So the roller engagement ring 15 is urged to the right as seen in FIG. 2 with the result that the terminal portions 13a of the rollers 13 are also urged to the right by the roller engagement ring 15 and the rollers 13 are moved radially inward along the respective slot 12 into engagement with the annular groove 17 of the inward sleeve 11.

The inward sleeve 11 is provided with a conically shaped terminal section 18. When the inward sleeve 11 is inserted into the outward sleeve 16f the conically shaped terminal section 18 engages the middle portions of the roller members 13 so that the roller members 13 are moved in radially outward direction along the slots 12, the roller engagement ring 15 being moved to the left by the terminal portions 13a of the roller members 13 against the action of the helical compression spring 70. As soon as the roller members 13 with their middle sections arrive at the circumferential groove 17 the roller members fall into the circumferential groove 17 so that the roller engagement ring 15 can return to the right under the action of the helical compression spring 70. The outward sleeve 16f rotates with the clutch housing 25 through the diaphragm spring 9. The inward sleeve 11 is in the locked condition fixed with respect to the outward sleeve 16f both for common axial movement and for common rotation. The ball bearing 3b permits rotation of the inward sleeve 11 with respect to the non-rotating clutch release unit 3a.

When the clutch is to be released the clutch release system is moved to the right. As a result thereof the inward sleeve 11 is always moved to the right and the outward sleeve 16 is pulled to the right by the inward sleeve 11 through the locking mechanism 2. As a result thereof the tongues 10 of the diaphragm spring 9 are moved to the right and the pressure plate 26 is lifted from the clutch disk 6. The clutch release force transmitted by the roller members 13 urges the roller members 13 radially inward, so that the engagement with the circumferential groove 17 is maintained even if the helical compression spring 7 is relatively weak.

A locking mechanism release ring 20 surrounds the outer sleeve 16f and is axially slidable along the radial outer surface 16g of the outward sleeve 16f. This locking mechanism release ring 20 comprises an axially directed engagement face 22 engaging the terminal sections 13a of the rollers 13 on the side remote from the roller engagement ring 15. The right hand terminal position of the locking mechanism release ring 20, as seen in FIG. 2, is defined by an abutment ring 21 fixed to the outward sleeve member 16f. The locking mechanism release ring 20 is held in engagement with the abutment ring 21 by the helical compression spring 7 through the roller engagement ring 15 and the terminal portions 13a of the roller members 13. Moreover, the locking mechanism release ring 20 is provided with an axially extending sleeve section 23 which surrounds the end portions 13a of the roller members 13 so that the roller members 13 are secured against movement in the tangential direction with respect to the axis of the clutch unit. The sleeve section 23 also surrounds at least a part of the roller engagement ring 15.

In order to unlock the locking mechanism 2 one must move the locking mechanism release ring 20 to the left as shown in FIG. 2. On such a movement of the locking mechanism release ring 20 to the left the engagement face 22 urges the terminal portions 13a of the rolling members 13 also to the left, so that the roller members 13 move radially outward along the slots 12. As soon as the roller members 13 have left the circumferential groove 17 in the radially outward direction the inward sleeve member 11 can be withdrawn to the right outwards of the outward sleeve member 16f.

The locking mechanism release ring 20 is easily accessible through an aperture 30 of the casing 27 so that the locking mechanism 2 can be easily unlocked when it is necessary to disassemble the casing 27 of the gear box from the casing 28 of the motor.

It is to be noted that the clutch release system 3 including the inward sleeve 11 is preassembled to the gear box casing 27 when the gear box casing 27 and the motor casing 28 are reassembled.

The invention is not only applicable to clutch units in which the release of the clutch is achieved by acting on a diaphragm spring. It is also applicable to clutch units in which release levers are provided independently from spring means urging the pressure plate 26 into engagement with the clutch disk 6.

The helical compression spring 70 can also be replaced by a plate spring or by a plurality of plate springs.

It is a great advantage of this invention that the locking mechanism can be locked and unlocked without any specific tool. It is easily to be seen that a simple rod-like instrument can be inserted into the aperture 30 for shifting the locking mechanism release ring 20 to the left as seen in FIG. 1. For the assembling of the motor casing 28 and the gear box casing 27 no instrument at all is necessary for locking the locking mechanism 2. The axial force to be applied on assembling for moving the roller members 13 in the radially outward direction is small. Also the force to be applied to the locking mechanism release ring 20 in disassembling is small. The roller members engage the circumferential groove 17 and the slot 12 with a considerably contact surface, so that high axial release forces can be transmitted. No wear is to be expected at the contact surfaces between the roller members 13, the slots 12 and the circumferential groove 17.

While specific embodiments of the invention have been shown and described in detail to illustrate the application of the inventive principles, it will be understood that the invention may be embodied otherwise without departing from such principles. The reference numbers in the following claims are only for better understanding and by no way restrictive.

What is claimed is:

1. A drive unit comprising:
 (a) a motor with a motor casing (28) and a motor output member (5) rotating about an axis of rotation;
 (b) a gear box with a gear box casing (27) fixed to said motor casing (28);
 (c) a pulled-type clutch unit for torque transmission between said motor and said gear box, said clutch unit having an axis coaxial with said axis of rotation and including
  (aa) a clutch housing (25) mounted to said output member (5) for rotation about said axis;
  (bb) an annular clutch release member (16) mounted for common rotation with said clutch housing (25) and for axial movement with respect to said clutch housing (25);
  (cc) a clutch release system (3) including
   (aaa) a non-rotating clutch release unit (3a) preassembled with said gear box casing (27) for axial movement along said axis with respect to said clutch housing (25);
   (bbb) a release system ring member (11) mounted on said non-rotating clutch release unit (3a) by clutch release bearing means (3b) for rotation about said axis and for common axial movement with said non-rotating clutch release unit (3a);
  (dd) a releasable locking mechanism (2) interconnecting said annular clutch release member (16) and said release system ring member (11) for common axial movement, said annular clutch release member (16) comprising a radially outward sleeve member (16f) and said release system ring member (11) comprising a radially inward sleeve member (11), said sleeve members (16f), (11) being axially coextensive over at least part of their respective axial lengths,
   (1) said outward sleeve member (16f) being provided with a plurality of circumferentially distributed slots (12), each of said slots (12) penetrating through said outward sleeve member (16f) with an angle α of inclination of less than 90° with respect to said axis, said angle diverging towards said motor output member (5);
   (2) said inward sleeve member (11) being provided with an annular groove (17) in its radially outer surface (19), said annular groove (17) being substantially in radial alignment with radial inner ends of said slots (12);
   (3) roller members (13) being provided in said slots (12) and engaging said annular groove (17);

(4) said roller members (13) having terminal portions (13a) extending beyond the radially outer surface (16g) of said outer sleeve member (16f);

(5) a roller engagement ring (15) surrounding said outward sleeve member (16f) at a location axially between said roller members (13) and said motor output member (5), said roller engagement ring (15) engaging said terminal portions (13a) of said roller members (13) in the axial direction;

(6) spring means (70) acting against said roller engagement ring (15) such as to urge said roller members (13) towards said radially inner ends of said slots (12) and—in the locked condition—into engagement with said annular groove (17);

(7) the radially outer surface of said inward sleeve member (11) comprising a conically shaped terminal section (18) urging said roller members (13) towards the radially outward ends of said slots (12) when said inward sleeve member (11) is inserted into said outward sleeve member (16f) before said roller members (13) can enter into said annular groove (17) such as to axially lock said sleeve members (16f,11) with respect to each other;

(8) a locking mechanism release ring (20) axially engaging said terminal portions (13a) of said roller members (13) on the side remote from said roller engagement ring (15); and (9) an aperture (30) being provided in said gear box casing (27) in such a position as to grant access to said locking mechanism release ring (20) in view of axially shifting said locking mechanism release ring (20) against the action of said spring means (70).

2. A drive unit as set forth in claim 1 further comprising an abutment member (21) provided on said outward sleeve member (16f), said spring means (70) urging said locking mechanism release ring (20) into engagement with said abutment member (21) through said roller engagement ring (15) and said roller members (13).

3. A drive unit as set forth in claim 2, said abutment member (21) being provided on the side of said locking mechanism release ring (20) which is remote from said output member (5).

4. A drive unit as set forth in claim 3, said abutment member (21) being defined by an abutment ring (21) engaging an annular groove in the radially outer face of said outward sleeve member (16f).

5. A drive unit as set forth in claim 1, wherein said locking mechanism release ring (20) comprises an axially extending sleeve section (23) surrounding the terminal portions (13a) of said roller members (13).

6. A drive unit as set forth in claim 5, said terminal portion (13a) of said roller members (13) engaging a radially inner cylindrical surface of said axially extending sleeve section (23).

7. A drive unit as set forth in claim 1, wherein said spring means (70) acting against said roller engagement ring (15) with one of their ends are supported with the other end by a spring support face (16d) provided on said outward sleeve member (16f).

8. A drive unit as set forth in claim 1, wherein the shapes of said slots (12) and said annular groove (13) are such that by clutch release forces to be transmitted by said locking mechanism, said roller members are urged towards engagement with the annular groove (17).

* * * * *